June 12, 1928.  1,673,041
F. N. CONNET ET AL
RATE OF FLOW CONTROLLER
Filed Oct. 29, 1926   5 Sheets-Sheet 4

Fig. 5.

Inventor
Frederick N. Connet and
George T. Huxford.
By Thomas A. Jenckes Jr
Attorney Patented June 12, 1928.

1,673,041

UNITED STATES PATENT OFFICE.

FREDERICK N. CONNET AND GEORGE T. HUXFORD, OF PROVIDENCE, RHODE ISLAND, ASSIGNORS TO BUILDERS IRON FOUNDRY, OF PROVIDENCE, RHODE ISLAND, A CORPORATION OF RHODE ISLAND.

RATE OF FLOW CONTROLLER.

Application filed October 29, 1926. Serial No. 145,091.

Our invention relates to rate of flow controllers, especially those designed for use in filtration plants.

One object of our invention is to provide a rate of flow controller operative at either relatively large or relatively small rates of flow.

A further object of our invention is to provide a rate of flow controller provided with rate setting means whereby the device may be set for different desired rates of flow.

A further object of our invention is to provide a rate of flow controller wherein the overall loss is reduced to a minimum. This is partially accomplished by making the entire device streamlined in so far as is practicable.

A further object of our invention is to provide a rate of flow controller having a rotary balanced louvre type of valve which may be very accurately adjusted. In our preferred embodiment we render the use of this general type of valve practicable by providing a flow dividing device adapted to divide the flow into streams which flow substantially along the axis of the rotary valve, whereby the entire valve may be symmetrical and hydraulically balanced. As stated, in addition to providing the flow dividing device, we have also designed a rate of flow controller, preferably by making it streamlined throughout, so that the objectionable loss of head formerly present in this type of valve may be reduced to a minimum, thereby rendering the use of valves of this type possible in this connection.

These and such other objects of our invention as may hereinafter appear will be best understood from a description of the accompanying drawings which illustrate embodiments of our invention.

In the drawings.

In the drawings, wherein like characters of reference indicate like parts throughout, 10 generally indicates a conduit. As stated, our improved rate of flow controller is of the type which may be adjusted to produce a desired set rate of flow.

Our invention in its broader aspects comprises in a rate of flow controller, the combination of a conduit 10, pressure differential producing means 12 attached to said conduit adapted to produce a pressure differential responsive to the rate of flow in said conduit, a diaphragm 14 or other movable element actuated by said differential, rate setting means 16 adjustable for different desired rates of flow acting on said diaphragm in opposition to the force exerted by the differential and a rotary balanced louvre valve 18 in said conduit 10 actuated by said diaphragm 14.

To reduce the friction losses in our invention to a minimum, in addition we preferably provide a flow dividing device 20 in said conduit to divide the flow into streams before passage through the balanced valve. In addition, as stated, in order to further reduce friction losses to a minimum we preferably so design our device to accomplish this function, in our preferred embodiment by making it streamlined in so far as possible. In addition, in order to provide a flow controller having as wide a range as possible and to further reduce friction losses at relatively high rates of flow, we preferably provide in addition to the main pressure differential producing means 12 attached to said conduit to control relatively large rates of flow, a second differential producing means 24 attached to said conduit especially designed to control relatively small rates of flow and when these two pressure differential producing means are employed, we preferably provide two alternate scales 26 and 28 on the rate setting medium 16, each to be used for its respective differential producing means 22 and 24.

In our improved embodiment the pressure differential producing means comprises a standard Venturi meter tube 22. Our preferred embodiment of secondary pressure differential producing means 24 attached to said conduit to control relatively small rates of flow, preferably comprises a secondary Venturi meter tube 24 attached to and submerged within said conduit 10 between the inlet 30 and throat 32 of the main Venturi meter tube, attached in this manner to amplify the differential produced by said main Venturi meter tube 22.

As stated, we provide a diaphragm 14 or other pressure responsive movable member such as a piston adapted to be actuated by the differential produced by the type of pressure differential producing means employed. We mount the diaphragm 14 approximately centrally of the usual diaphragm casing 34, which in our preferred embodiment is not located in the meter tube.

To transmit the motion of said diaphragm we attach thereto the heavy split head 36 having the usual piston rod 38 projecting upwards therefrom through a suitable stuffing box 40 in said diaphragm casing 34.

As stated, the differential produced by the differential producing means employed actuates the diaphragm 14. In our preferred embodiment we connect the pressure differential producing means to said diaphragm to function in this manner by connecting the inlet 30 of the main pressure differential producing means 22 to the portion 34$^a$ of the diaphragm casing 34 above said diaphragm by means of the pipe 42 having the operating valve 44 therein, and we connect the throat 32 of the main Venturi meter tube to the lower portion 34$^b$ of said diaphragm casing below the diaphragm 14 by means of the pipe 46 having the operating valve 48 therein. Where a secondary pressure differential producing means is employed, such as the secondary Venturi meter tube 24, we preferably also connect the low pressure portion thereof to the portion 34$^b$ of the diaphragm casing 34 below the diaphragm 14, preferably by connecting the throat 49 of the secondary submerged Venturi meter tube to the aforesaid pipe 46 by means of the pipe 50 having the operating valve 52 therein. It is thus obvious that either the throat 32 of the main Venturi meter tube 22 or the throat 49 of the submerged secondary Venturi meter tube 24 may be alternately connected with the portion 34$^b$ of the diaphragm casing 34 by alternately opening and closing the valves 48 and 52.

The combined Venturi meter tube 12, which comprises the outer main tube 22 and the submerged tube 24, amplifies the differential produced by the large outer Venturi tube in the embodiment shown in the drawings in a ratio of approximately eight to one since the loss of head in the submerged Venturi meter tube 34 is approximately one-eighth of its differential. Therefore, with the construction shown, the compound differential will be approximately eight times the difference in pressure at the inlet and outlet of the submerged Venturi meter tube 24. Due to the fact that only a small percent of the total flow through the conduit 10 is brought to the high velocity which it obtains at the throat 49 of the submerged Venturi meter tube 24, the loss of head due to the entire combined meter tube 12 is much smaller than would be the loss of head for a simple Venturi meter tube capable of producing the same high pressure differential. In general, with differential rate of flow controllers, inaccuracy occurs at lower rates of flow, since the differential varies with the square of the rate of flow and therefore is excessively low at small rates. The function of the combined Venturi meter tube 12 is to create a usable differential at low rates where it is desirable to control the rate of flow at different rates over a wide range. As stated, the large tube 22 alone would be alternately used for controlling the flow at all higher rates. The use of the compound tube also further permits the use of a large throat on a larger Venturi tube and consequently the loss through the Venturi cone regainer is reduced to a minimum.

As stated, we provide rate setting means 16 adjustable for different desired rates of flow which acts on said diaphragm 14 in opposition to the force exerted by the differential. In our preferred embodiment, said rate setting means preferably includes the balanced adjusting lever 60, preferably balanced by means of the fulcrum knife-edge 62 on the base 64 projecting upwards from said conduit 10. The weight arm 63 of said adjusting lever 60 has mounted thereon the adjusting scale 26, and the slidable weight 66 adjustable thereon relative to said scale. The power arm 68 of said lever has also mounted thereon the counterbalancing weight 70 and is suitably connected to the piston rod 38 projecting upwards from said diaphragm 14 by means of the link 72. The power arm 68 of said adjusting lever is suitably connected to the rotary louvre valve shaft 19 by means of the link mechanism 74. Where the secondary Venturi meter tube 24 or other secondary differential producer is employed, the weight 66 may be adjusted along the weight arm 63 of said lever in accordance with the indications on the scale 28, also located thereon. It is noted that the weight arm 63 of said lever is at a slight angle to the power arm 68 thereof for a reason about to be explained. It has been found experimentally that the effective area of the diaphragm acted upon by the differential increases as the diaphragm 14 is pulled upwards. Our invention functions by changing the position of the diaphragm. The diaphragm itself must move an appreciable distance relative to its diameter with the motion of the valve. It is for this reason that the adjustable rate setting balance weight 66 is mounted on the inclined beam 60. As the diaphragm 14 rises, the weight 66 falls in an arc, the center of which is the knife edge 62 supporting the beam 60. Its effective leverage is increased as the scale beam 60 approaches horizontally. In this way, such an excellent compensation may be made for the variable effective area of the diaphragm 14 that the rate of flow will be maintained substantially constant regardless of the diaphragm and valve position.

As stated, we preferably employ a flow dividing device 20 operative to direct the flow, preferably without shock, from the direction of the axis of the conduit 10 into substantially equal streams flowing outwardly substantially along the axis of said rotary valve shaft 19 and the guide casings 80 shaped to redirect, preferably without shock, the divided streams to form further downstream, a combined stream flowing along the axis of the conduit. It is obvious, however, that a single stream may be divided into a plurality of streams flowing radially outward from the axis of said conduit without specifically employing any flow dividing device 20 or that said flow dividing device may be constructed integrally with the valve body.

As stated, we employ a rotary balanced louver valve 18 which, so far as we are aware, is new in flow controllers, adapted to control the rate of flow of the aforesaid divided streams. In the preferred embodiment shown in Figs. 1–4, we preferably employ as a preferred embodiment of rotary louver valve, a balanced rotary double disc sectorial type of valve. In our preferred embodiment, we provide a sectorial type of double rotary disc valve, one disc for each of the oppositely directed streams. In our preferred embodiment, we provide sectorial valve seats 82 (Figs. 2 and 3) on the portions of the guide casings 80 adjacent the conduit 10, having the preferably streamlined sectorial ports 84. We rigidly mount on said rotary valve shaft 19 adjacent to said respective valve seats 82, the preferably streamlined sectorial valve discs 86 having streamlined sectorial openings 88 therein.

Figure 1:
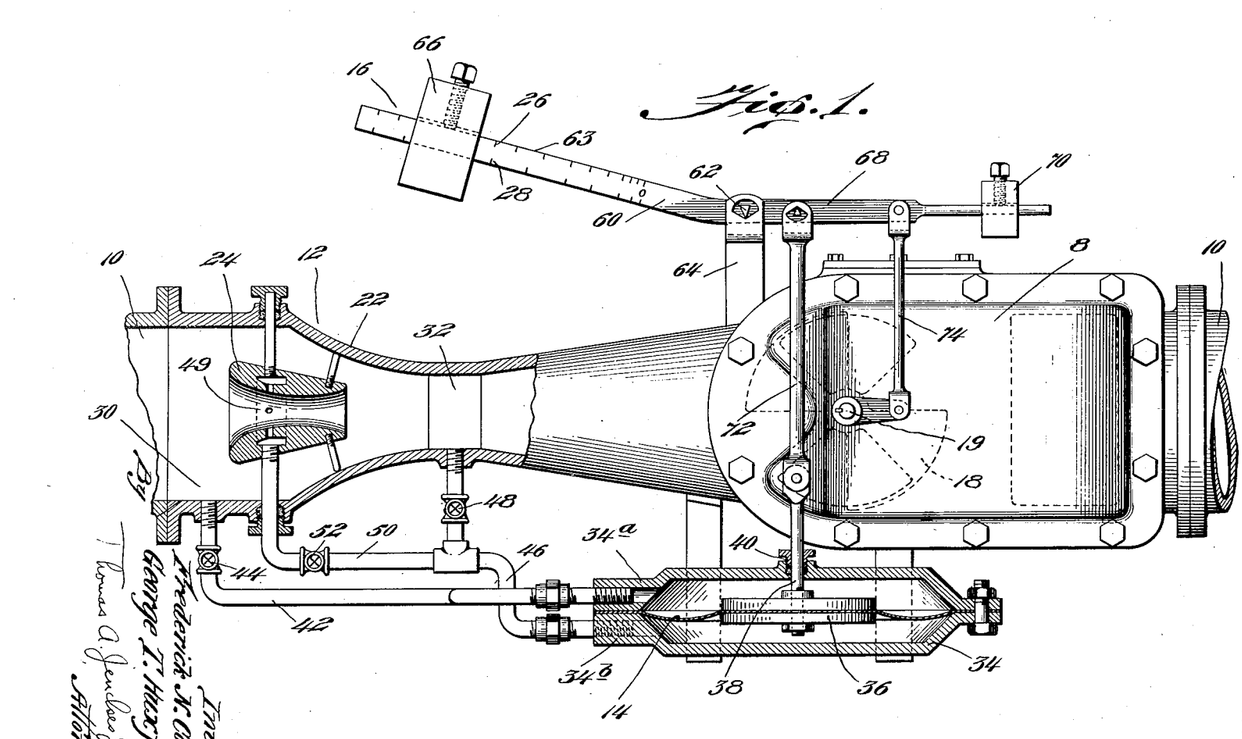
Fig. 1 is a side elevation partially shown in section of the preferred embodiment of our invention.
Figure 2:
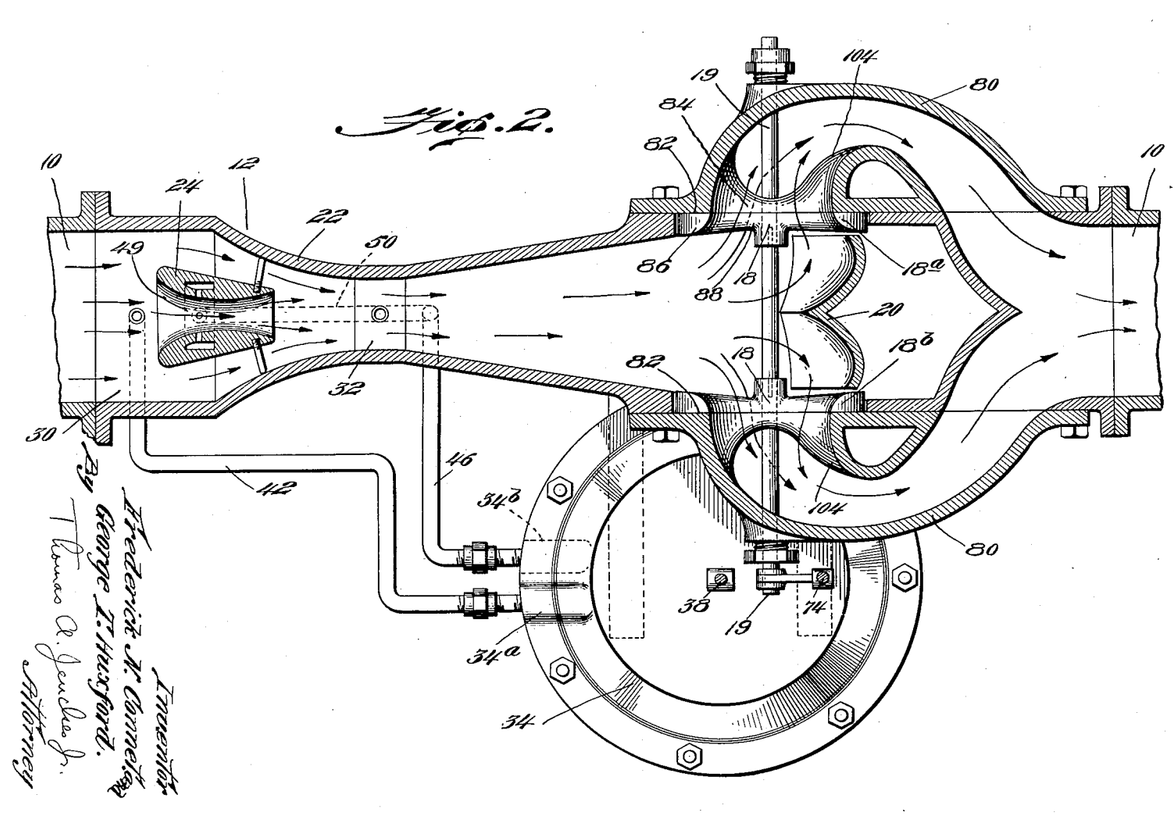
Fig. 2 is a longitudinal horizontal sectional view taken generally along the longitudinal axis of the conduit, the portion adjacent the rotary louver valve being taken above the horizontal axis of said conduit and the portion below the horizontal axis thereof being shown in plan.
Figure 3:
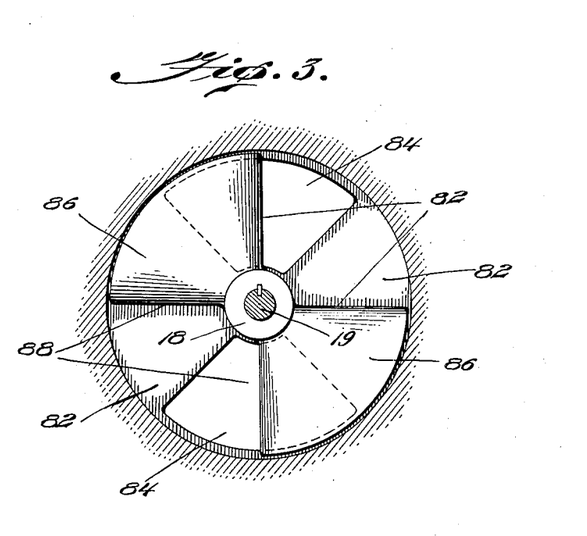
Fig. 3 is a detailed end elevation of the rotary segmental disc valve we preferably employ.

It is obvious that, as the position of the rotary valve shaft 19 is varied, as explained, by means of the diaphragm or other movable member employed acting through the medium of the rate setting device 16 upon said shaft 19, the rotary balanced sectorial disc valves 18$^a$ and 18$^b$ will have their effective area correspondingly varied. The sectorial valve discs 86 each have preferably two openings 88. The liquid flowing through these two openings into the guide casings 80 may be most effectively redirected and joined in the downstream conduit 10 by means of the streamlined respective passages of the guide casings 80 as shown in Fig. 2. The streamlining of the guide casings 80 co-operates with the streamlining of the ports 84 and openings 88 of the valves 18$^a$ and 18$^b$. A larger number of openings than shown would markedly reduce the ability of the streamlining of the guide casings 80 to produce a minimum loss of head when the valve 18 is wide open.

Figure 5:
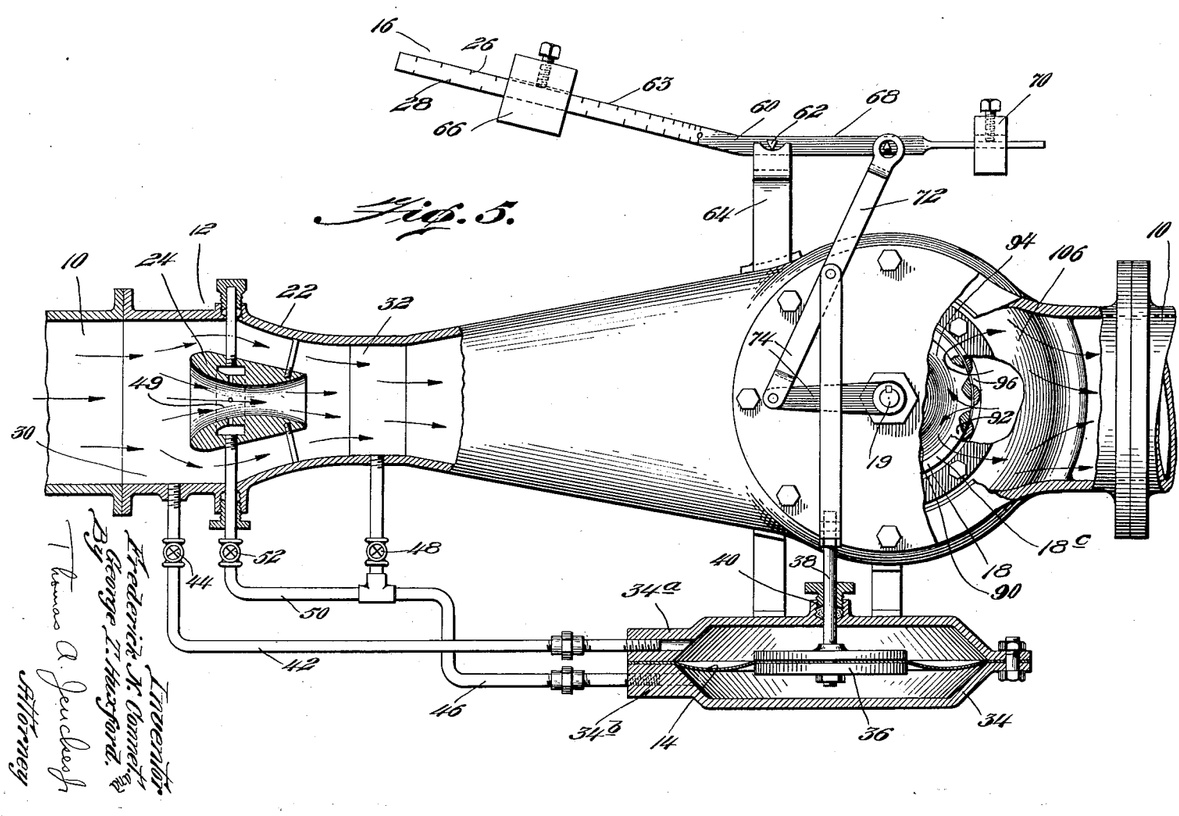
Fig. 5 is a side elevation partially shown in section similar to Fig. 1 of a different embodiment of our invention.
Figure 6:
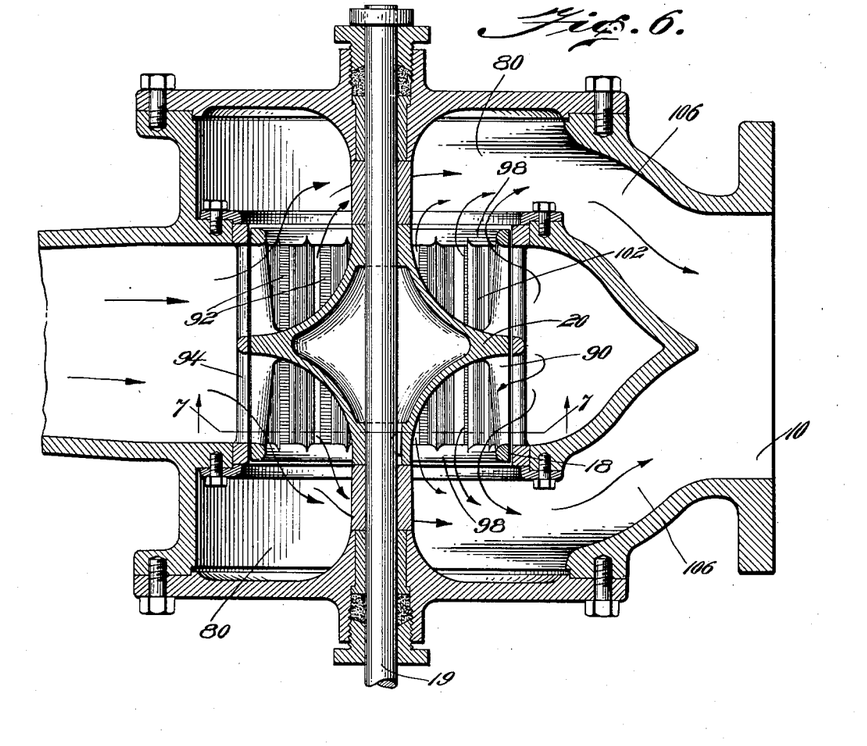
Fig. 6 is a horizontal sectional view taken along the longitudinal horizontal axis of the embodiment of our invention shown in Fig. 5, adjacent the valve thereof.
Figure 7:
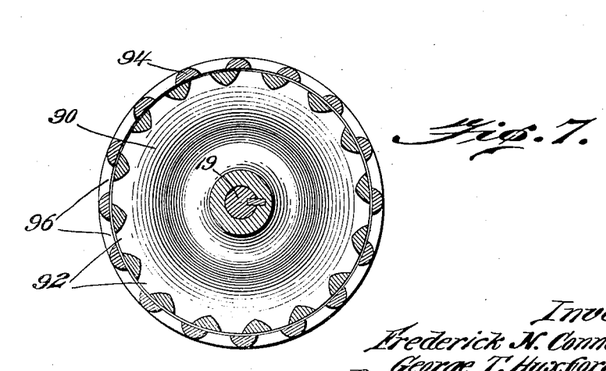
Fig. 7 is a vertical sectional view taken along the line 7—7 of Fig. 6.

In the embodiment shown in Figs. 5–7, we employ a cylindrical type of rotary disc valve 18$^c$. Said disc valve 18$^c$ comprises the cylindrical rotor 90, provided with the axial slotted openings 92 on the periphery thereof and a co-operating cylindrical valve seat 94 located preferably centrally of the conduit 10, having the co-operating axial slotted ports 96. Said ports and openings 92 and 96 are, as shown preferably streamlined. The ends 98 of said cylindrical rotor 90 are preferably open to admit the oppositely-divided streams outwardly along the axis of the valve shaft 19 into the guide casings 80.

It is obvious that a large number of the ports 96 and openings 92 in the valve seat 94 and the cooperating cylindrical rotor 90 may be used and that by suitably streamlining these passages, the loss through the valve proper will be reduced to a minimum and that as large a number of these openings may be used as seems desirable. The loss of head through the complete valve will not be dependent upon fine stream lining of the guide casings 80 as the flowing fluid is moving at relative low velocity through the passages therein, co-operating with the aforesaid fine streamlining of said valve 18$^c$.

As stated, the type of rotary louver valve employed is balanced against end thrust and also against side thrust on the axis of the shaft 19. The valve is balanced hydraulically against end thrust by having its elements symmetrically disposed relatively to the axis of the conduit. Said valve is further balanced against side thrust on the axis of the shaft by having the flow act radially equally around the entire circumference of the valve.

The rotary type of valve is particularly well suited for rate of flow controllers since the frictional force on the bearings and necessary stuffing box is reduced to a minimum. In the past, however, with the possible exception of a butterfly valve, this general idea of using a rotary valve has not been practicable for the reason that the loss of head due to such a valve was considerably more than was desirable. The pivoted butterfly valve itself is markedly inferior for use in a direct acting flow controller to the type of balanced rotary louver valve employed by us, as the butterfly valve exerts a self-closing torque when nearly closed and also in this position has a prohibitive bearing friction due to the unbalanced pressure on the two sides of the valve. It is obvious that the rotary balanced louver valve 18 is not subject to the direct forces exerted by the movable element 14 and rate setting means 16, but the rotary louver valve 18, is so connected to the rate setting means that said valve stem 19 is only acted upon by the difference between said opposing forces which permits the valve stem to be of minimum diameter to further reduce stuffing box and bearing friction upon this valve stem. Due to the difficulties of properly lubricating this shaft which must necessarily operate in the presence of water, it is exceedingly important that the friction on this shaft be reduced to the absolute minimum.

Figure 4:
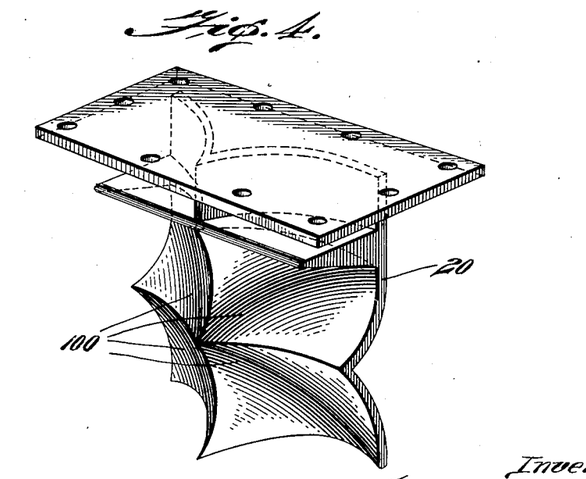
Fig. 4 is a perspective view of our preferred form of flow dividing device.

The objectionable loss of head of rotary valves has in the past prevented the use of this type of valve. To overcome this objection, we have not only employed a rotary louver type of valve but we have also provided a flow dividing device 20 operative to direct the flow without shock from the direction of the axis of the conduit without large losses to form streams which move outward substantially along the axis of the rotary valve shaft 19. Where the type of valve 18 shown in Figs. 1-5 is employed, having the valve openings disposed on the faces of discs, we preferably shape the flow dividing device 20 in a form similar to the efficient Pelton water-wheel buckets successfully used on high head hydraulic power installations to thus redirect the flow without shock. As shown in Fig. 4 we preferably so shape the flow divided 20 so as to have four of these buckets 100 all flaring outwardly and downstreamwardly, two on each side of the axial line of said conduit to direct the flow into the individual valve seat openings 84 with a minimum loss. In the embodiment shown in Figs. 5-7, we preferably shape the flow dividing device 20 in the form of a double symmetrical conoid of revolution 102, of the type efficiently employed in the Francis turbine design, to direct the flow after it has passed through the streamlined co-operative valve openings 92 and 96 of the cylindrical valve 18ᶜ into streams flowing outwardly along the axis of the valve shaft 19 through the end passages 98 of said valve rotor 90 into the guide casings 80. It is obvious, however, that other types of flow dividing devices may be employed to divide the flow without shock.

As stated, we employ the guide casings 70 80 shaped to redirect, preferably without shock, the divided streams to form a combined stream flowing along the axis of the conduit downstream of the controlling device. While any suitable form of guide casings may be employed, in the preferred embodiment of our invention shown in Figs. 1-4, we have preferably streamlined the guide casings 80 as at 104 to accomplish this result without shock in a manner hitherto explained. In the embodiment shown in Figs. 5-7, we preferably shape the guide casings 80 in generally cylindrical form, having passages 106 converging from the downstream sides thereof to the downstream portion of the conduit 10 to make use of the hydraucone regainer principle for converting the direction of flow from along the axis of the valve shaft 19 back to that of the conduit 10. In the embodiment shown in Figs. 1-4, as shown more particularly in sectional plan in Fig. 2, it is apparent that the center lines of the valve openings, when in wide open position are in a plane perpendicular to the direction of the conduit and thus, when the conduit is in the horizontal position shown, are in a vertical plane one above the other. As the valve openings are of substantially the size of the guide casings, it is apparent that each fluid particle will flow through the valve openings and out through the guide casings in a substantially uniplanar flow, the direction of flow of each fluid particle being in a plane substantiallly parallel to the direction of flow of the other fluid particles contained in the flowing fluid.

It is thus obvious that as we have employed, we believe for the first time, a rotary louver type of valve in a direct acting flow controller, preferably with a flow dividing device and preferably with the entire device designed to transmit the flow therethrough without shock, we believe that we have provided a new type of practical rate of flow controller.

I employ the term rotary balanced louver valve to include any type of rotary valve having a plurality of openings in the valve casing and a plurality of co-operating openings in the rotary member thereof adapted to be brought in and out of register respectively with the openings in the valve casing, to vary the size of the composite openings produced thereby, balanced against end and side thrust.

It is understood that our invention is not limited to the specific embodiments shown and that various deviations may be made therefrom without departing from the spirit and scope of the appended claims.

What we claim as new and desire to secure by Letters Patent is:

1. In a rate of flow controller, the combination of a conduit, pressure differential producing means attached to said conduit adapted to produce a pressure differential responsive to the rate of flow in said conduit, a movable element actuated by said differential, rate setting means adjustable for different desired rates of flow acting on said movable element in opposition to the force exerted by the differential, a flow dividing device in said conduit to divide the flow into streams and a rotary balanced louver valve for the streams of divided flow actuated by said movable element.

2. In a rate of flow controller, the combination of a conduit, pressure differential producing means attached to said conduit adapted to produce a pressure differential responsive to the rate of flow in said conduit, a diaphragm actuated by said differential, rate setting means adjustable for different desired rates of flow acting on said diaphragm in opposition to the force exerted by the differential, a flow dividing device in said conduit to divide the flow into streams and a rotary balanced louver valve for the streams of divided flow actuated by said diaphragm.

3. In a rate of flow controller, the combination of a conduit, pressure differential producing means attached to said conduit adapted to produce a pressure differential responsive to the rate of flow in said conduit, a diaphragm actuated by said differential, a rotary balanced louver valve having its axis substantially normal to the conduit to control the rate of flow actuated by said diaphragm and having its ports and openings streamlined, rate setting means adjustable for different desired rates of flow acting on said diaphragm in opposition to the force exerted by the differential, a flow dividing device operative to direct the flow without shock from the direction of the axis of the conduit into substantially equal streams flowing substantially along the axis of said rotary valve and guide casings shaped to redirect without shock the divided streams to form a combined stream flowing along the axis of the conduit.

4. In a rate of flow controller, the combination of a conduit, pressure differential producing means attached to said conduit adapted to produce a pressure differential responsive to the rate of flow in said conduit, a diaphragm actuated by said differential, a rotary balanced louver valve having its axis substantially normal to the conduit actuated by said diaphragm to control the rate of flow, rate setting means adjustable for different desired rates of flow acting on said diaphragm in opposition to the force exerted by the differential, a flow dividing device operative to direct the flow from the direction of the axis of the conduit into substantially equal streams flowing substantially along the axis of said rotary valve and guide casings shaped to redirect the divided streams to a combined stream flowing along the axis of the conduit.

5. In a rate of flow controller, the combination of a conduit, pressure differential producing means attached to said conduit adapted to produce a pressure differential responsive to the rate of flow in said conduit, a diaphragm actuated by said differential, a rotary balanced louver valve having its axis substantially normal to the conduit to control the rate of flow actuated by said diaphragm and having its ports and openings streamlined, rate setting means adjustable for different desired rates of flow acting on said diaphragm in opposition to the force exerted by the differential, a streamlined flow dividing device operative to direct the flow from the direction of the axis of the conduit into substantially equal streams flowing substantially along the axis of said rotary valve and streamlined guide casings shaped to redirect the divided streams to a combined stream flowing along the axis of the conduit.

6. In a rate of flow controller, the combination of a conduit, pressure differential producing means attached to said conduit adapted to produce a pressure differential responsive to the rate of flow in said conduit, a diaphragm actuated by said differential, a valve shaft having its axis substantially normal to the conduit actuated by said diaphragm, rate setting means adjustable for different desired rates of flow acting on said diaphragm in opposition to the force exerted by the differential, a streamlined flow dividing device operative to direct the flow from the direction of the axis of the conduit into two substantially equal streams flowing outwards substantially along the axis of said rotary valve shaft, two balanced symmetrical sectorial rotary disc valves, having streamlined ports and openings, one for each stream of flow, having the sectorial discs thereof mounted on said valve shaft and streamlined guide casings shaped to redirect the divided streams to a combined stream flowing along the axis of the conduit.

7. In a rate of flow controller, the combination of a conduit, a pressure differential producer attached to said conduit to control relatively large rates of flow, a second pressure differential producer attached to said conduit to control relatively small rates of flow, a diaphragm, means to connect alternately either pressure differential producer to said diaphragm so that the differential produced thereby may actuate said diaphragm, rate setting means for different desired rates of flow acting on said diaphragm in opposition to the force exerted by the differential and a rotary balanced louver valve in said conduit actuated by said diaphragm.

8. In a rate of flow controller, the combination of a conduit, a main Venturi meter tube attached to said conduit to control relatively large rates of flow, an auxiliary Venturi meter tube attached to and submerged within said conduit between the inlet and throat of the main Venturi meter tube to amplify the differential produced by said main Venturi tube to control relatively small rates of flow, a diaphragm, means to connect the inlet pressure to one side of said diaphragm, means to connect alternately the throat pressure of either meter tube to the opposite side of said diaphragm, rate setting means adjustable for different desired rates of flow acting on said diaphragm in opposition to the force exerted by the differential and a rotary balanced louver in said conduit actuated by said diaphragm.

9. In a rate of flow controller, the combination of a conduit, a main Venturi meter tube attached to said conduit to control relatively large rates of flow, an auxiliary Venturi meter tube attached to and submerged within said conduit between the inlet and throat of the main Venturi tube to amplify the differential produced by said main Venturi tube to control relatively small rates of flow, a diaphragm actuated by the differential, means to connect the inlet pressure to one side of said diaphragm, means to alternately connect the throat pressure of the main or submerged Venturi tube to the opposite side of said diaphragm, rate setting means adjustable for different desired rates of flow acting on said diaphragm in opposition to the force exerted by the differential, a flow dividing device in said conduit to divide the flow into streams and a rotary balanced louver valve for the streams of divided flow controlled in its position by said diaphragm.

10. In a rate of flow controller, the combination of a conduit, a main Venturi meter tube attached to said conduit to control relatively large rates of flow, an auxiliary Venturi meter tube attached to and submerged within said conduit between the inlet and throat of the main Venturi tube to amplify the differential produced by said main Venturi tube to control relatively small rates of flow, a diaphragm actuated by the differential, means to connect the inlet pressure to one side of said diaphragm, means to alternately connect the throat pressure of the main or submerged Venturi tube to the opposite side of said diaphragm, a rotary balanced louver valve having its axis substantially normal to the conduit to control the rate of flow actuated by said diaphragm and having its ports and openings streamlined, rate setting means adjustable for different desired rates of flow acting on said diaphragm in opposition to the force exerted by the differential, having a rate setting scale for use with the main Venturi tube alone in controlling relatively large rates of flow and a rate setting scale adapted for alternate use with the submerged Venturi tube in controlling relatively small rates of flow, a flow dividing device operative to direct the flow without shock from the direction of the axis of the conduit into substantially equal streams flowing substantially along the axis of said rotary valve and guide casings shaped to redirect without shock the divided streams to form a combined stream flowing along the axis of the conduit.

11. In a rate of flow controller, the combination of a conduit, a main Venturi meter tube attached to said conduit to control relatively large rates of flow, an auxiliary Venturi meter tube attached to and submerged within said conduit between the inlet and throat of the main Venturi tube to amplify the differential produced by said main Venturi tube to control relatively small rates of flow, a diaphragm actuated by the differential, means to connect the inlet pressure to one side of said diaphragm, means to alternately connect the throat pressure of the main or submerged Venturi tube to the opposite side of said diaphragm, a rotary balanced louver valve having its axis substantially normal to the conduit to control the rate of flow actuated by said diaphragm, rate setting means adjustable for different desired rates of flow acting on said diaphragm in opposition to the force exerted by the differential, having a rate setting scale for use with the main Venturi tube alone in controlling relatively large rates of flow and a rate setting scale adapted for alternate use with the submerged Venturi tube in controlling relatively small rates of flow, a flow dividing device operative to direct the flow from the direction of the axis of the conduit into substantially equal streams flowing substantially along the axis of said rotary valve and guide casings shaped to redirect the divided streams to form a combined stream flowing along the axis of the conduit.

12. In a rate of flow controller, the combination of a conduit, pressure differential producing means attached to said conduit adapted to produce a pressure differential responsive to the rate of flow of liquid in said conduit, a pivotally mounted lever, a diaphragm actuated by said differential and connected to said lever near the pivot point thereof, means adjustable for different rates of flow acting on said lever and hence on said diaphragm in opposition to the force exerted by said differential and a rotary balanced louver valve in said conduit connected to said lever at a substantially greater distance from the pivot point thereof so as to exert only a substantially small proportion of the difference between the opposing forces exerted by said diaphragm and said opposing means on said valve and to increase the travel of said valve to reduce the hydraulic friction loss therein.

13. In a rate of flow controller, the combination of a conduit, pressure differential producing means attached to said conduit adapted to produce a pressure differential responsive to the rate of flow in said conduit, a diaphragm actuated by said differential, rate setting means adjustable for different desired rates of flow acting on said diaphragm in opposition to the force exerted by the differential and a rotary balanced symmetrical sectorial double disc valve in said conduit actuated by said diaphragm, each disk having two diametrically opposed substantially sectorial openings therein, with the center lines of the openings in a plane perpendicular to the direction of the conduit when in a wide open position.

14. In a flow controller, the combination of a balanced rotary louver valve, a casing therefor, having passages therein, said passages having substantially all direction changes occurring parallel to one plane, whereby a flow without vortex formation is produced.

15. In a flow controller, the combination of a rotary balanced valve, a casing therefor having passages therein, said passages having substantially all direction changes occurring parallel to one plane, whereby a flow, without vortex formation, is produced.

16. In a flow controller, the combination of a rotary balanced valve, a divided casing therefor having circuitous passages therein, said passages being so shaped that all direction changes thereof substantially maintain the centers thereof parallel to one plane, whereby a substantially uniplanar flow of each fluid particle through the valve and passages without vortex formation is produced.

In testimony whereof we affix our signatures.

FREDERICK N. CONNET.
GEORGE T. HUXFORD.